United States Patent
Julien et al.

(10) Patent No.: US 6,612,262 B2
(45) Date of Patent: Sep. 2, 2003

(54) ANIMAL TATTOO DEVICE

(75) Inventors: Anne Julien, Beauport (CA); Richard Boutet, Beauport (CA)

(73) Assignee: Ketchum Manufacturing Inc., Ottawa (CA)

( * ) Notice: Subject to any disclaimer, the term of this patent is extended or adjusted under 35 U.S.C. 154(b) by 0 days.

(21) Appl. No.: 10/167,387

(22) Filed: Jun. 13, 2002

(65) Prior Publication Data

US 2002/0189550 A1 Dec. 19, 2002

(30) Foreign Application Priority Data

Jun. 15, 2001 (GB) .............................. 0114562

(51) Int. Cl.⁷ .......................... A01K 29/00; B43K 5/00
(52) U.S. Cl. ........................ 119/712; 119/712
(58) Field of Search .................. 119/712, 50.7; 81/9.22; 101/26

(56) References Cited

U.S. PATENT DOCUMENTS

| 304,613 | A | * | 9/1884 | Carey | 101/26 |
| 498,519 | A | * | 5/1893 | Lewis et al. | 346/141 |
| 1,378,166 | A | * | 5/1921 | Amoedo | 101/26 |
| 1,489,558 | A | * | 4/1924 | Timson | 101/26 |
| 1,780,715 | A | * | 11/1930 | Olson et al. | 101/26 |
| 2,126,777 | A | * | 8/1938 | Holt | 101/26 |
| 2,239,761 | A | * | 4/1941 | Stone | 101/20 |
| 2,541,684 | A | * | 2/1951 | Barger | 101/26 |
| 2,681,003 | A | * | 6/1954 | Rossi et al. | 101/26 |
| 3,098,430 | A | * | 7/1963 | Ruthen et al. | 101/26 |
| 3,633,584 | A | * | 1/1972 | Farrell | 101/19 |
| 3,798,688 | A | * | 3/1974 | Wasson | 7/14.1 R |
| 4,214,490 | A | * | 7/1980 | Chizek | 101/26 |
| 4,392,493 | A | * | 7/1983 | Niemeijer | 101/19 |
| 4,440,078 | A | * | 4/1984 | McCrery et al. | 101/26 |
| 5,385,072 | A | * | 1/1995 | Neff | 81/405 |
| 5,893,303 | A | * | 4/1999 | Harris | 81/44 |
| 5,961,494 | A | * | 10/1999 | Hogan | 604/191 |
| 6,206,270 | B1 | * | 3/2001 | Huang | 228/138 |
| 6,264,637 | B1 | * | 7/2001 | Hogan | 604/191 |

* cited by examiner

*Primary Examiner*—Yvonne Abbott
(74) *Attorney, Agent, or Firm*—George A. Seaby

(57) ABSTRACT

A device for tattooing an animal such as a rodent includes a tweezers-shaped body having resilient arms with free ends, which can be squeezed together and when released will return to a spaced apart, rest position. A needle carried by the free end of one arm is aligned with a hole in the free end of the other arm, so that when an area of animal, e.g. a rodent toe, is placed between the fee ends and the arms are pressed together, the needle penetrates the animal to deposit ink beneath the skin of the animal.

4 Claims, 4 Drawing Sheets

ANIMAL TATTOO DEVICE

BACKGROUND OF THE INVENTION

1. Field of the Invention

This invention relates to a device for identifying laboratory animals, and in particular to an animal tattoo device.

Laboratory animals such as small rodents are widely used for research purposes in various fields such as the medical, pharmaceutical and biotechnical fields. The animals usually used for research purposes include mice and rats which are often used in large numbers even in a relatively small laboratory. Since the animals are often involved in studies comparing the effect of various factors on the animals, it is crucial to be able to identify the animals which have been subjected to particular treatments.

2. Discussion of the Prior Art

Commonly used existing methods for identifying animals include affixing metal or plastic identification tags to the ear or another area of the animal, punching of body parts such as the ears of the animal, embedding electronic chips in an animal's body, clipping of some body parts such as toes of an animal, and marking animals with a felt pen or the like. All of the existing methods, however, suffer from major drawbacks.

Identification ear tags can be removed accidentally and are often associated with an increased risk of infection, especially if the tag is worn for a long period of time.

A more permanent type of identification involves puncturing an animal typically an appendage, such as the ear using a sharp instrument. The puncturing of the ears of the animal can result in tearing of the ears between identification holes. Moreover, the method is difficult to effect with relatively young animals, and the method is somewhat limited since it allows for identification of a small number of animals only.

Electronic chips or similar electronic identification devices in an animal to produce a signal, which can be read by a portable reader. The use of such electronic devices requires minor surgery to implant the electronic device in the animals, and is associated with relatively high costs, because the electronic devices are typically quite expensive.

The clipping of a section of the toe of an animal is considered to be quite painful to the animal, and should be done under anesthesia. Clipping leads to a relatively high risk of infection, and is a very controversial method which may soon be banned.

The use of a felt marking pen or a similar writing implement results in temporary marking which must be repeated at relatively frequent intervals. Typically, the mark produced on an animal lasts for one to two days and must then be reapplied.

Another possibility is the use of conventional tattooing. However, conventional tattooing involves an electrically operated apparatus including tattoo needles which vibrate against the skin. The operator must move the apparatus to form a pattern. Such apparatuses are much too heavy and cumbersome for use on small animals, and lack the necessary precision to be used for such purpose.

GENERAL DESCRIPTION OF THE INVENTION

Thus, a need still exists for an improved animal identification device. An object of the present invention is to meet such need by providing a relatively simple animal tattoo device, which solves the above described problems associated with existing animal identification devices and methods.

Another object of the invention is to provide an animal tattoo device, which results in minimal pain to the animal and does not require anesthesia. The device allows for simple marking of the animal, without requiring a large degree of dexterity or talent. The device allows for quick and easy marking of animals, leaving a relatively permanent mark that can be repeated.

Accordingly, the present invention relates to an animal tattoo device comprising a body including first and second arms connected together at one end and having normally spaced apart, opposed free ends in a rest position;

a hypodermic needle on the free end of said first arm extending toward the free end of said second arms for carrying a supply of ink;

a hole in the free end of said second arm for receiving said needle when the free ends of said first and second arms are moved towards each other, whereby, when an area of an animal is placed between said free ends of the first and second arms, movement of the free ends towards each other will cause the needle to pass through the area of the animal to deposit ink beneath the skin of the animal.

The device facilitates the application of distinct identifying marks to a relatively large number of animals. The device can be used with a variety of animals at different stages of their life cycle including relatively young animals, typically as young as one week old.

The device is relatively inexpensive, and reduces the risk of infection to animals. The device is safe both to the operator and to the animal. The device is specifically designed to be manufactured using conventional manufacturing techniques. Moreover, the device is durable, relatively trouble free in operation, and requires minimal maintenance.

BRIEF DESCRIPTION OF THE DRAWINGS

The invention is described below in greater detail with reference to the accompanying drawings, wherein.

DESCRIPTION OF THE PREFERRED EMBODIMENT

Figure 1:
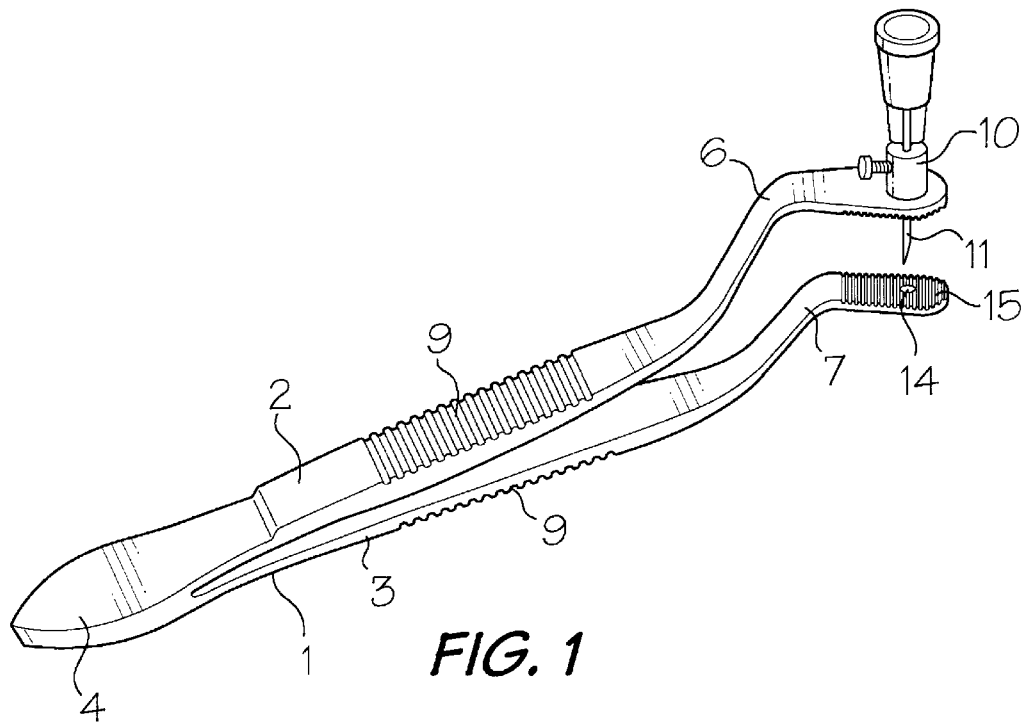
FIG. 1 is an isometric view of a preferred embodiment of the animal tattoo device in accordance with the present invention.
Figure 2:
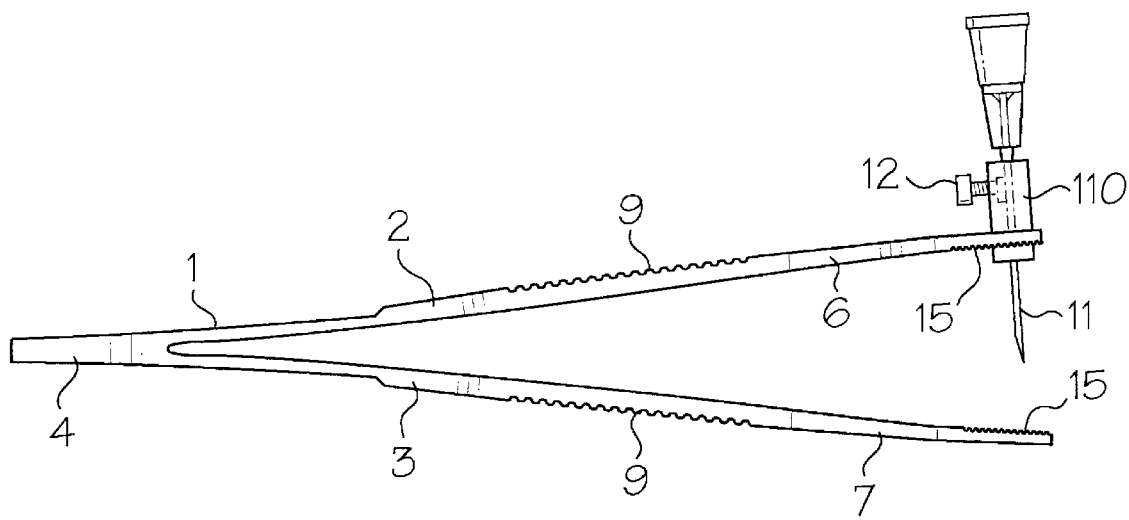
FIG. 2 is a top view of the device of FIG. 1.

Referring to FIGS. 1 and 2, an animal tattoo device in accordance with the invention includes a tweezer-shaped body 1 defined by a pair of arms 2 and 3 interconnected at one end by a generally V-shaped head 4. The arms 2 and 3 diverge away from the head 4, and are resilient, so that when the other, free ends 6 and 7, respectively of the arms are pressed together and released, they return to the rest position shown in FIGS. 1 and 2. The body 1 is formed of a suitable metal, e.g. stainless steel or a polymeric resin.

Serrations 9, i.e. alternating ridges and grooves extending transversely of the outer surfaces of the arms 2 and 3 approximately at the middle thereof for facilitating grasping and manipulation of the arms by an operator.

The free ends 6 and 7 of the arms 2 and 3 are generally V-shaped when viewed from either side, the angle between the sides of the V typically being 120°. The V-shaped ends make it easier to grip a portion of an animal, e.g. a leg between the arms 2 and 3.

A sleeve 10 for holding a needle 11 is mounted in the free end 6 of one of the arms 2. The needle 11 is releasably retained in the sleeve 10 by a screw 12. A hole 14 is provided in the free end of the other arm 3 for receiving the needle 11 when the arms are pressed together. The area of the inner surfaces of the arms 2 and 3 around the needle 11 and around the needle-receiving hole 14 include serrations 15 for improving gripping of an animal by the arm 3.

Figure 3:
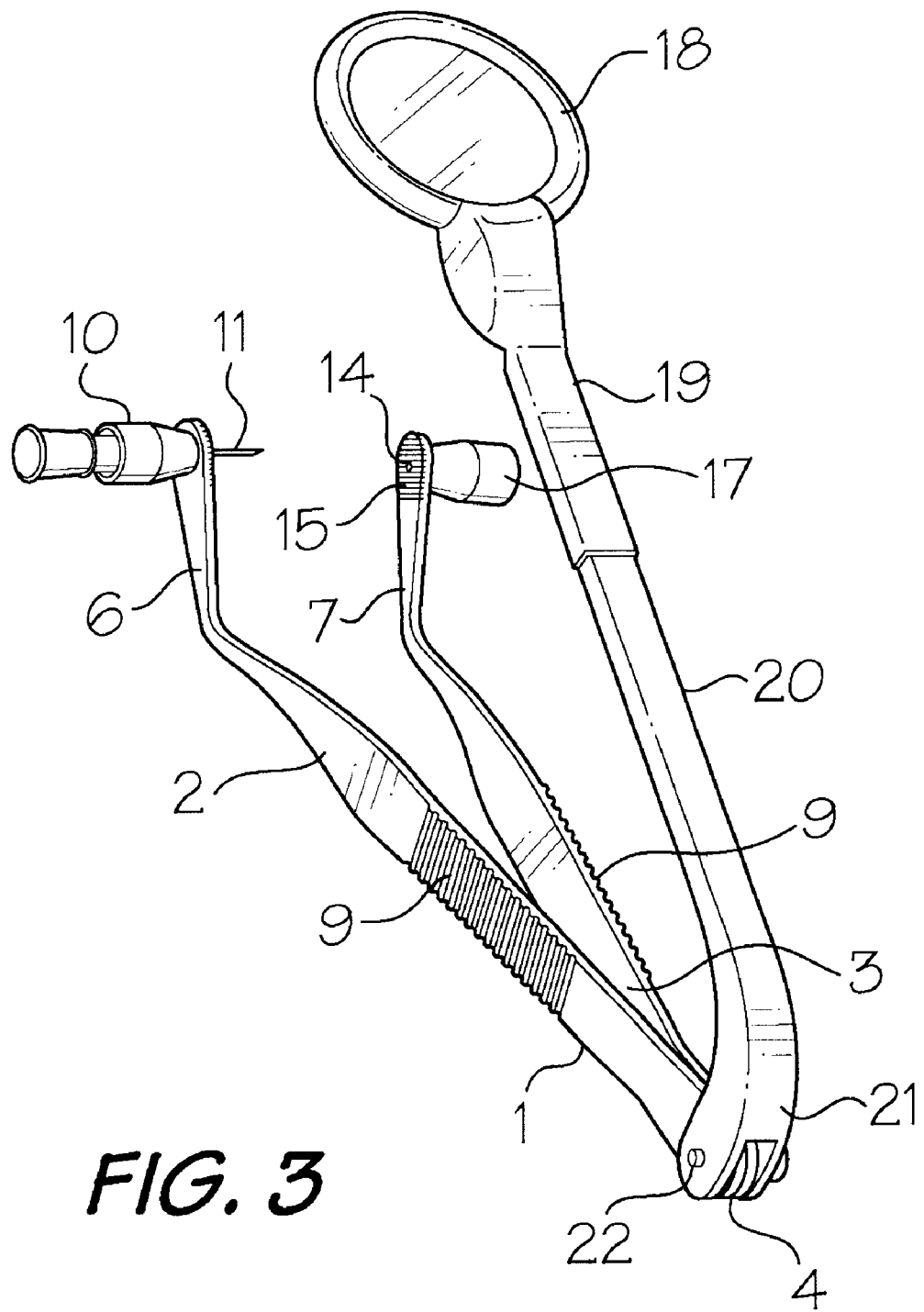
FIG. 3 is an isometric view of a second embodiment of the tattoo device of the present invention.

Referring to FIG. 3, a second embodiment of the invention includes essentially the same elements as the embodiment shown in FIGS. 1 and 2. Accordingly, wherever possible, the same reference numerals have been used to identify the same or different elements.

The second embodiment of the invention includes a metal cup 17 on the free end 7 of the arm 3 which is filled with ink, e.g. green paste. Each time the hypodermic needle 11 passes through the hole 14 it picks up a supply of paste. A magnifying glass 18 is mounted on the outer free end 19 of an arm 20 to facilitate the tattooing of small animals. The other, arcuate end 21 of the arm 20 is pivotally connected to the head 4 of the body 1 by a pin 22.

Figure 4:
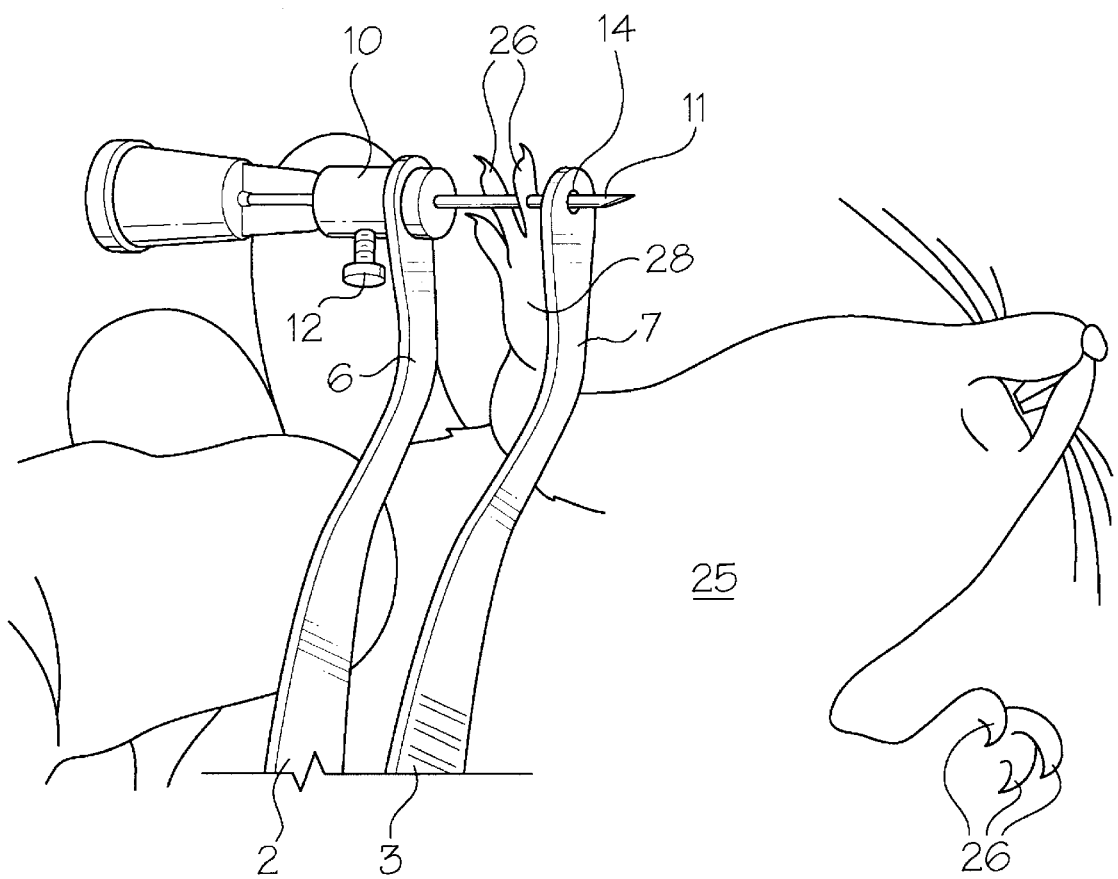
FIG. 4 is an isometric view of one end of the device of FIGS. 1 and 2 during a tattooing operation.
Figure 5:
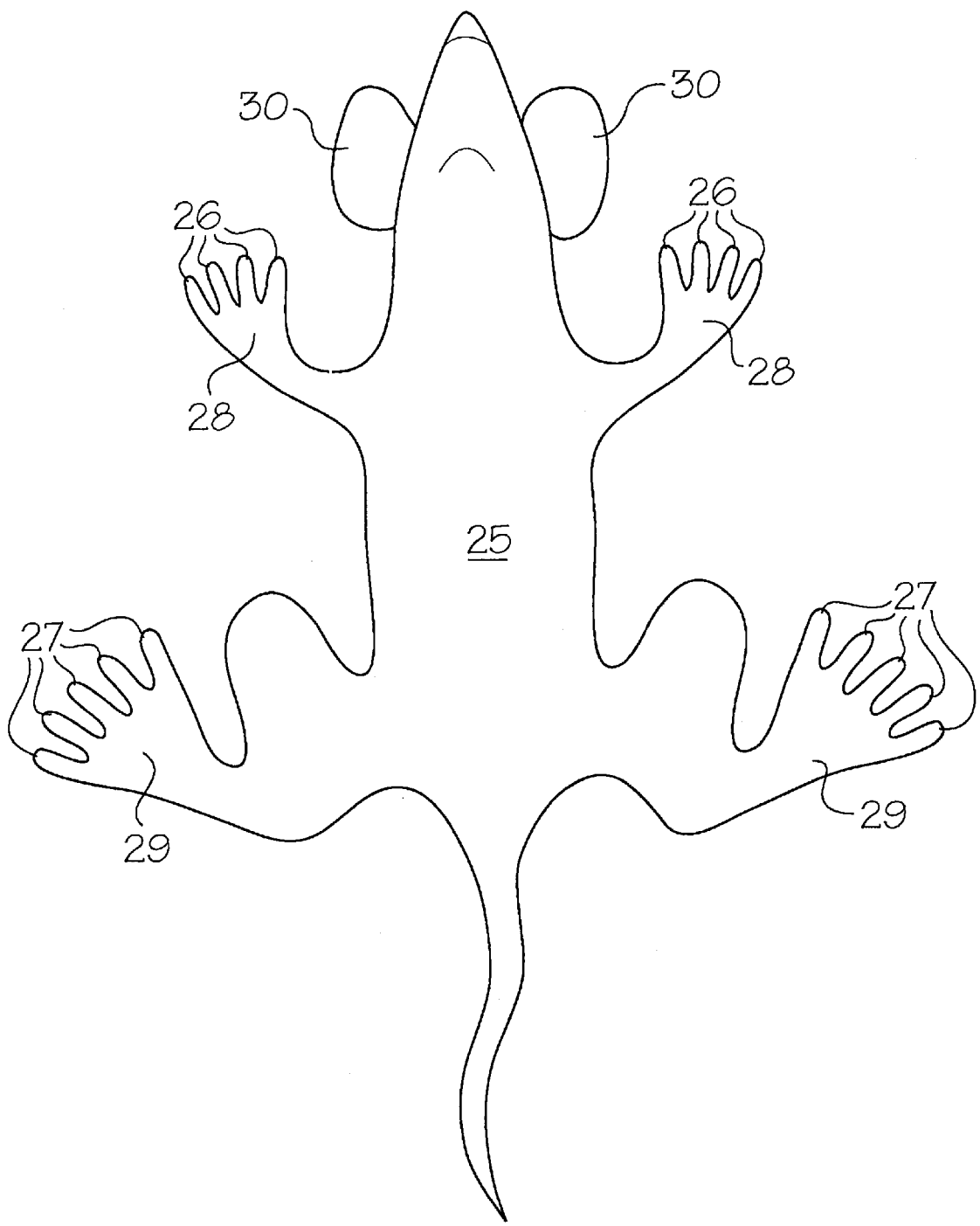
FIG. 5 is a schematic, bottom view of a rodent.

With reference to FIG. 4, when using the first embodiment of the invention, an animal 25 (in this case a mouse or a rat) is first immobilized on its back using the conventional method. Green or another color paste is placed on the skin in the area of the animal to be tattooed. The arms 2 and 3 of the body 1 are pressed together to cause the needle 11 to pass through the area being tattooed. When the arms 2 and 3 are released, the needle returns through the area to deposit paste beneath the skin of the animal.

In the case of the second embodiment of the invention, when the needle 11 passes through the hole 14 in the arm 3, it enters the cup 17 and picks up a supply of paste. When the arms 2 and 3 are released, the needle 11 returns to the rest position. By squeezing the arms 2 and 3 together in the absence of an animal therebetween, the needle 11 is preloaded. Thus, paste will be deposited during movement of the needle 11 in both directions.

The areas of a rodent 25 which are tattooed include the toe pads 26 and 27 on the front and rear feet 28 and 29, respectively, the feet 28 and 29 themselves and the ears 30. Numbers are assigned to the various areas of the animal body which can be tattooed. The numbers are used to identify individual animals. Thus, by selecting various areas for tattooing and tattooing one or more different areas of many animals, the number of animals having distinctive, identifying tattoos will be quite large. The size of the needle 11 is determined by the body part being tattooed and by the age or size of the animal. By using sterile, disposable needles, the risk of contamination and obstruction by dried ink is avoided. Tattooing provides a visible identification for the life of an animal.

We claim:

1. A small animal tattoo device comprising a body including:

a solid, one-piece head;

first and second resilient arms, one end of each said first and second arms being connected to and extending outwardly from one end of said head, said arms having opposed free ends normally spaced apart in a rest position;

a single hypodermic needle on the free end of said first arm extending toward the free end of said second arm for carrying a supply of ink; and a hole in the free end of said second arm for receiving the needle when the free ends of said first and second ends are pressed towards each other, whereby, when, during a tattooing operation, an area of a small animal is placed between said free ends of the first and second arms and finger pressure is applied to said arms near said free ends, said free ends move towards each other to cause the needle to pass through the area of the animal to deposit ink beneath the skin of the animal, and when the arms are released, the arms automatically return to the rest position ready for another tattooing operation.

2. The tattoo device of claim 1 including an ink container on the free end of said second arm, said container being aligned with said hole for receiving the needle when the arms are pressed together and the needle passes through the hole by movement of said free ends towards each other, whereby the needle enters the container and picks up a supply of ink and, when the arms are released, the needle carrying the ink passes back through the animal to deposit ink beneath the skin of the animal.

3. The tattoo device of claim 1, including finger grips on said first and second arms facilitating manipulation of said arms.

4. The tattoo device of claim 1, including serrations on at least one free end of said first and second arms for gripping an animal placed between the free ends.

* * * * *